(12) United States Patent
Strack et al.

(10) Patent No.: US 12,085,146 B2
(45) Date of Patent: Sep. 10, 2024

(54) SEPARATOR FOR AN ENERGY CHAIN

(71) Applicant: IGUS GMBH, Cologne (DE)

(72) Inventors: Stefan Strack, Koenigswinter (DE); Dominik Barten, Meckenheim (DE)

(73) Assignee: IGUS GMBH, Cologne (DE)

( * ) Notice: Subject to any disclaimer, the term of this patent is extended or adjusted under 35 U.S.C. 154(b) by 946 days.

(21) Appl. No.: 17/041,645

(22) PCT Filed: Mar. 26, 2019

(86) PCT No.: PCT/EP2019/057643
§ 371 (c)(1),
(2) Date: Jan. 11, 2021

(87) PCT Pub. No.: WO2019/185662
PCT Pub. Date: Oct. 3, 2019

(65) Prior Publication Data
US 2021/0131527 A1 May 6, 2021

(30) Foreign Application Priority Data
Mar. 26, 2018 (DE) .................... 20 2018 101 686.5

(51) Int. Cl.
*F16G 13/16* (2006.01)
*H02G 3/04* (2006.01)
*H02G 11/00* (2006.01)

(52) U.S. Cl.
CPC .................................. *F16G 13/16* (2013.01)

(58) Field of Classification Search
CPC ....... F16G 13/16; H02G 3/0475; H02G 3/006
See application file for complete search history.

(56) References Cited

U.S. PATENT DOCUMENTS 3,848,407 A * 11/1974 Moritz .................... F16G 13/16
248/51
5,027,595 A 7/1991 Hart
(Continued)

FOREIGN PATENT DOCUMENTS

| CN | 1332899 | 1/2002 |
| CN | 102449867 | 5/2012 |

(Continued)

OTHER PUBLICATIONS

English translate (DE202017100200U1), retrieved date Jul. 13, 2023.*

(Continued)

*Primary Examiner* — Mohammed S. Alawadi
(74) *Attorney, Agent, or Firm* — Grossman, Tucker, Perreault & Pfleger, PLLC

(57) ABSTRACT

A separating web for an energy chain for arranging between two cross webs. The separating web has recesses for mounting a respective compartment base. Each recess is flanked by a rigid continuous support region on one side and by an insertion opening on the other side for inserting a compartment base, and each recess is provided with an elastic tongue element for partly closing the insertion opening and for securing the compartment base. According to the invention, the elastic tongue element extends from the insertion opening to the opposing support region. One end of the tongue element is connected to the edge of the insertion opening, and the other end is connected to the support region. The tongue element side facing away from the recess is equipped with a free area into which the elastic tongue element can be deflected when inserting and removing a compartment base.

12 Claims, 2 Drawing Sheets

(56) References Cited

U.S. PATENT DOCUMENTS

| | | | |
|---|---|---|---|
| 5,630,738 | A | 5/1997 | Ito et al. |
| 6,354,070 | B1 | 3/2002 | Blase |
| 8,397,480 | B2 | 3/2013 | Jaeker et al. |
| 10,693,285 | B2 | 6/2020 | Jaeker |
| 2017/0108082 | A1 | 4/2017 | Barten |
| 2019/0360555 | A1 | 11/2019 | Hermey et al. |

FOREIGN PATENT DOCUMENTS

| | | | | |
|---|---|---|---|---|
| CN | 106461027 | | 2/2017 | |
| CN | 107005036 | | 8/2017 | |
| DE | 69010522 | | 1/1995 | |
| DE | 19609146 | A1 * | 9/1997 | ............ F16G 13/16 |
| DE | 202015101707 | | 10/2015 | |
| DE | 202015101707 | U1 * | 11/2015 | ............ F16G 13/16 |
| DE | 202017100200 | | 3/2017 | |
| DE | 202017100200 | U1 * | 3/2017 | ............ F16G 13/16 |

OTHER PUBLICATIONS

English translate (DE202015101707U1), retrieved date Aug. 10, 2023.*

English translate (DE19609146A1), retrieved date Aug. 10, 2023.*

Office Action from related Japanese Appln. No. 2020-551580, dated Oct. 4, 2022. English translation attached.

English translation of the International Search Report from corresponding PCT Appln. No. PCT/EP2019/057643, dated May 10, 2019.

English translation of the International Preliminary Report on Patentability from corresponding PCT Appln. No. PCT/EP2019/057643, dated Sep. 29, 2020.

Igus. New and proven 2017 Igus, Nov. 24, 2017. pp. 1-119. Retrieved from the Internet: https ://www .igus.nl/contentData/ Product_Files/Download/pdf/EN-DE_News2017 the-chain_web. pdf, Germany.

* cited by examiner

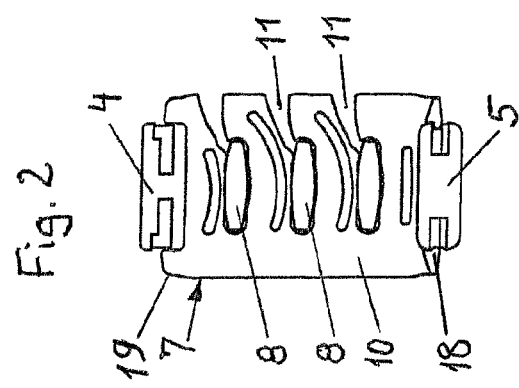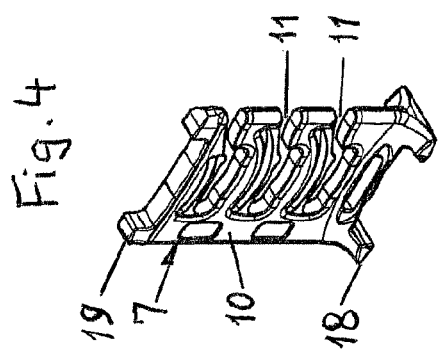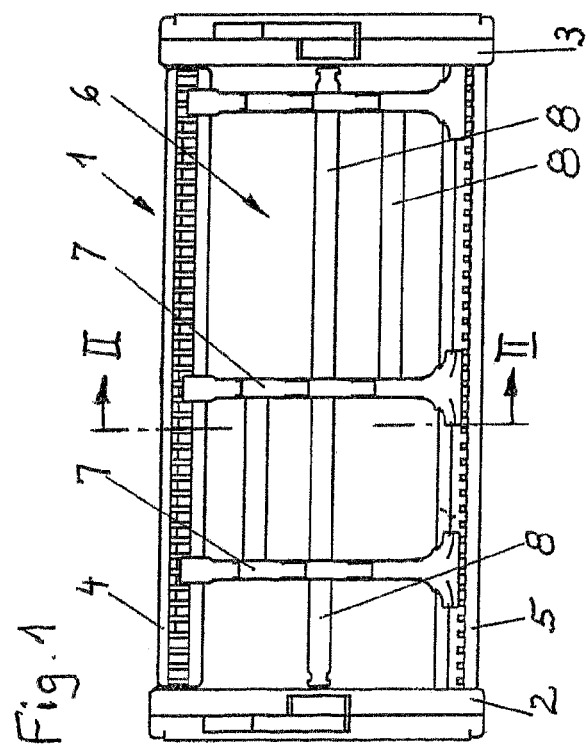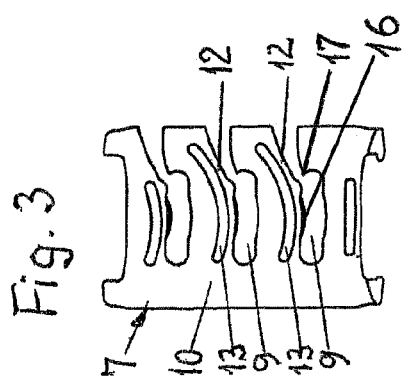

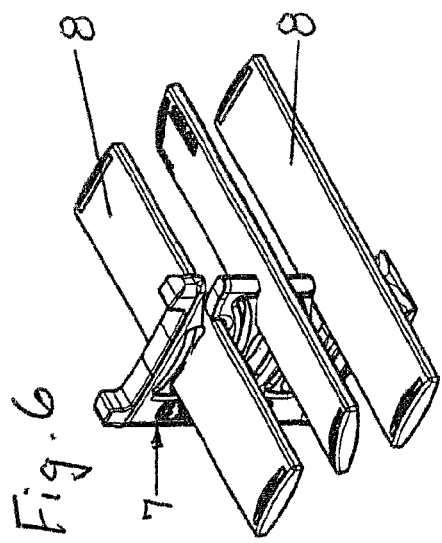
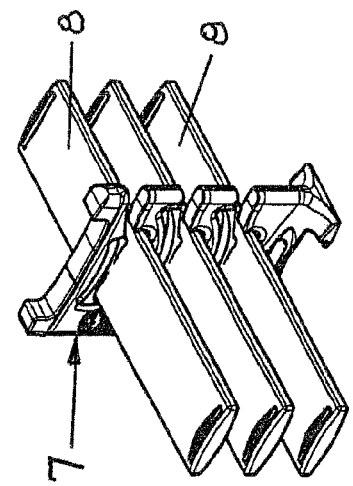
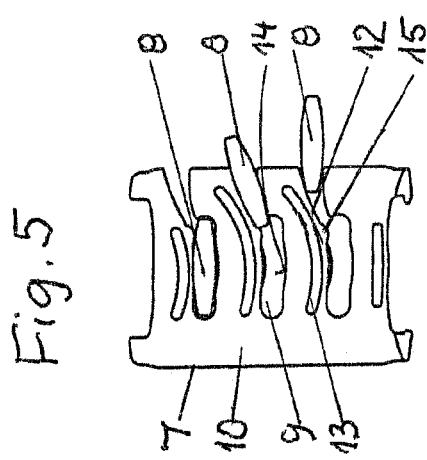
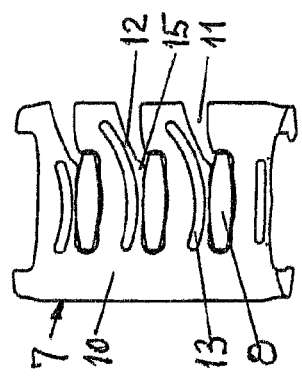

SEPARATOR FOR AN ENERGY CHAIN

FIELD

The invention concerns a separator for an energy guiding chain comprising pivotably interconnected chain links which have two side plates which at least in some chain links are connected together by two transverse bars and define a guide passage for lines, in which separators can be arranged between the transverse bars and can be arrested at at least one of the transverse bars and plate-like compartment bottoms can be arranged substantially perpendicularly to the separators. For that purpose the separator has at least one and usually a plurality of recesses in which a respective compartment bottom can be held and wherein provided at a lateral end of each recess is a continuous rigid support region and provided at the opposite lateral end is a respective insertion opening connected to the respective recess for insertion of a compartment bottom and wherein the insertion openings are provided with a respective resilient tongue element for partially closing the respective insertion opening and for securing the respective inserted compartment bottom.

BACKGROUND

Energy guiding chains serve for reliably and securely guiding flexible supply lines which connect together two connecting locations which are movable relative to each other.

The invention also concerns an energy guiding chain equipped with separators.

A known energy guiding chain of the general kind set forth is described in DE 20 2017 100 200 U1 and WO 2018/130721 A1. Here vertical separators and horizontal compartment bottoms are already used for internal division of the guide passage, the compartment bottoms being held in recesses in the separators. In a specific embodiment of the separator described in WO 2018/130721 A1 (see FIGS. 4A-4B) the insertion opening is partially closed with a resilient tongue element, wherein for insertion of the respective compartment bottom into the recess of the separator the tongue element is deflected while after lateral insertion of the compartment bottom it snaps back and arrests the compartment bottom in the recess. Such a structure is advantageous but that structure can be further improved.

Taking that state of the art as the basic starting point the object of the invention is to further optimise the holding of the compartment bottom in the separator and in particular to facilitate and speed up insertion and removal of the compartment bottoms.

SUMMARY

According to the invention the object is already attained in that the resilient tongue element extends substantially from the insertion opening to the opposite rigid support region of the separator, the one end of the tongue element is connected to the edge of the insertion\opening and the other end to the support region, and provided on that side of the tongue element, that is facing away from the recess, is a free space into which the resilient tongue element can elastically deflect during insertion and removal of a compartment bottom.

By virtue of the features according to the invention it is possible for the compartment bottoms to be relatively easily pushed laterally into the recesses in the separators and in the longitudinal direction of the energy guiding chain, in which case they are fixedly held in the recess in the separator by means of the resilient tongue element. For removal of the compartment bottoms they only need to be pulled out of the recesses in the opposite direction without a tool being required for the purpose.

A core aspect of the invention therefore lies in the particular configuration of at least one resilient tongue element of the separator, in which it is possible to ensure that the compartment bottoms are reliably held in place in spite of simplified insertion and removal thereof.

The support region is rigid, in particular flexurally rigid, in relation to the main plane of the separator, more specifically in such a way that in regular use it does not experience any bending during insertion and removal of a compartment bottom. That can be achieved in particular by suitable dimensioning, insofar as the support region has a sufficient material thickness adjoining the respective recess or recesses, that material thickness being greater for example by a multiple than the material thickness of the tongue element or elements which in intended use are flexible.

Preferably the separator is made from plastic. That has the advantage that the separator can be in the form of a one-piece component and can be produced inexpensively, for example using injection moulding. In addition, the desired elastic deformability of the tongue element or elements can be inherently achieved in that way by suitable dimensioning.

In that configuration the elastically deformable tongue element can also be formed on the separator, more specifically in such a way that the one end of the tongue element is integrally formed at the edge of the insertion opening and the other end is also integrally formed at the support region.

The delimiting wall of the recess, that is in opposite relationship to the resilient tongue element, is desirably adapted to the external contour of the plate-shaped compartment bottom to be inserted so that the latter can be fixedly anchored in a stable orientation in the separator. Preferably in that case the resilient tongue element is arranged along the longitudinal side, for example above or below, of the compartment bottom to be inserted.

The resilient tongue element preferably has on the side facing towards the recess a projecting nose which serves for improving the fit of the compartment bottom in the separator.

In that case the projecting nose on the tongue element is desirably arranged near the inner end of the insertion opening so that the fit of the compartment bottom and thus its hold in the recess is optimum.

In order still further to optimise the stable fit of the compartment bottom in the recess in the separator the projecting nose, when the compartment bottom is inserted, can bear against the compartment bottom under a prestressing in the region of the end of the compartment bottom, that is facing towards the insertion opening.

Fitment of the compartment bottoms is facilitated if all insertion openings or recesses of the respective separator open towards the same narrow side of the separator. The narrow side is opposite to the support region.

A preferred configuration which promotes elastic deformation is one in which the main dimension of the associated free space is greater than the corresponding main dimension of the associated recess. Particularly preferably the main dimension (optionally along a curved line) is at least 60%, in particular at least 65%, of the maximum dimension of the separator in the longitudinal direction of the chain, measured at the central region of the separator or at the height of the associated recess (that is to say not at the upper or lower fixing region for the transverse bars).

On the side facing towards the recess the tongue element has a latching projection for securing a compartment bottom in a direction transversely relative to the longitudinal direction of the chain or in a direction perpendicular to the main plane of the separator. In that way the tongue element can serve not only for holding the compartment bottom in the recess to prevent displacement thereof in the longitudinal direction of the chain, but also for arresting the compartment bottom in a direction transversely relative to the longitudinal direction of the chain. It is possible in that way to dispense with a separate "holding spring" above/below the recess, as is previously known for example from DE 20 2017 100 200 U1.

All the above-mentioned preferred features also concern the separator as part of an energy guiding chain comprising pivotably interconnected chain links which have two side plates which at least in some chain links are connected together by two transverse bars and define a guide passage for lines, including vertical separators which are arranged between the transverse bars and are arrested at same, and horizontal plate-like compartment bottoms which are held in recesses in the separators, wherein provided at a lateral end of the recesses is a continuous rigid support region and provided at the opposite lateral end is a respective insertion opening connected to the respective recess for insertion of a compartment bottom and wherein the insertion openings are provided with a respective resilient tongue element for partially closing the insertion openings and for securing the respective inserted compartment bottom.

BRIEF DESCRIPTION OF THE DRAWINGS

The invention is illustrated by way of example in the drawing and is described in detail hereinafter with reference to the drawing in which:

FIG. 1 shows a section through an embodiment of an energy guiding chain;

FIG. 2 shows a section along line II-II in FIG. 1;

FIG. 3 shows a view of the separator shown in isolation;

FIG. 4 shows a perspective view of the separator of FIG. 3;

FIG. 5 shows a similar view of the separator to FIG. 3, illustrating insertion of the compartment bottoms;

FIG. 6 shows a perspective view of FIG. 5;

FIG. 7 shows a view of the separator with completely inserted compartment bottoms; and FIG. 8 shows a perspective view of FIG. 7.

DETAILED DESCRIPTION OF THE DRAWINGS

FIG. 1 of the drawing is a cross-section through an embodiment of an energy guiding chain 1 according to the invention in the region of a chain link. Each chain link has two side plates 2 and 3 connected together by two transverse bars, more specifically by an upper transverse bar 4 and a lower transverse bar 5. The side plates 2 and 3 and the transverse bars 4 and 5 form a guide passage 7 for receiving and guiding flexible lines like for example cables, hoses and the like. The transverse bars 4, 5 can be so-called opening bars (here equivalent to transverse bar) or for example can be produced in one piece with a side plate 2, 3. An opening bar can be mounted for example pivotably to a side plate 2, 3 and can be latchable to the other side plate 2, 3 or can be releasably latched to both side plates 2, 3.

For internal division it is known, as shown in FIG. 1, to use vertical separators 7 and horizontal compartment bottoms 8. The vertical separators are disposed between the transverse bars 4 and 5 and are held thereto. The horizontal compartment bottoms 8 which are of a plate-like configuration and are arranged parallel to the transverse bars 4 and 5 are held in recesses 9 in the separators 7, as can be seen from FIGS. 2 and 5 to 8.

Each separator 7 has two holding regions for respective holding purposes at the respective transverse bar 4, 5. In the illustrated examples the holding regions are a holding foot 18 and a holding head 19. The holding foot 18 is designed for arresting or latching at a transverse bar 5, in particular also to prevent displacement in the transverse direction along the transverse bar 5, as shown in FIG. 2. In the installed state of the separator 7 the holding head 19 lies held in the longitudinal direction at the transverse bar 4, without latching. If the energy guiding chain has opening bars it is advantageous if the separator 7 is so installed that the holding head 19 bears against an opening bar so that the opening bar can be opened in uncomplicated fashion for maintenance purposes. The holding foot 18 and the holding head 19 hold the respective separator 7 in the installation state, that is to say with the chain link closed in the longitudinal direction captively at the oppositely disposed transverse bars 4, 5.

Each separator 7 has a plate-like central region which has the recesses 9 in the form of through openings extending continuously transversely relative to the main plane. The width direction and the height direction of the separator 7 lie in the main plane of the separator 7 (see FIG. 2/FIG. 3), wherein the width direction corresponds to the longitudinal direction of the energy guiding chain 1 and the height direction corresponds to the direction perpendicular thereto and perpendicular to the transverse direction. Provided at one of the lateral ends of the recesses 9 is a continuous vertical rigid support region 10 which extends over the entire height of the separator 7 and which is substantially not flexible. Provided at the opposite lateral end of the respective recess 9 is a respective insertion opening 11 which is connected to the recess 9 and which serves for insertion of a compartment bottom 8. The lateral insertion openings 11 are respectively combined with a resilient tongue element 12 which partially closes the respective insertion opening 11 and provides that the respective inserted compartment bottom 8, after lateral insertion through the insertion openings 11, fits tautly in the respective recess 9 in the separators 7.

The resilient tongue element 12 extends from the insertion opening 11 to the opposite rigid support region 10 of the separator 7, wherein the one end of the tongue element 12 is connected to the edge of the respective insertion opening 11 and the other end is connected in one piece to the rigid support region 10.

Provided on that side of the tongue element 12 that is remote from the recess 9 is a free space 13, into which the resilient tongue element 12 can elastically deflect during insertion and removal of the respective compartment bottom 8, and which in the inserted state of the respective compartment bottom 8 holds same fixedly in the recess 9.

The separators 7 are made from elastically deformable highly stable plastic. In that way the separators can each be in the form of a one-piece portion, wherein the elastic tongue elements 12 can also be formed integrally directly at the material of the separator 7. The one end of the respective tongue element 12 is formed at the edge of the respective insertion opening 11 and the other end at the vertical support region 10. The separators 7 can be produced in particular in an injection moulding method.

The delimiting wall 14 of the respective recess 9, that is opposite to the resilient tongue element 12, is adapted to the external contour of the plate-shaped compartment bottom 8 to be inserted so that the compartment bottoms fit firmly and securely in the recesses 9 and are stably and non-losably secured in the recesses by means of the resilient tongue elements 12.

In the embodiment illustrated in the drawing the resilient tongue elements 12 are disposed above the compartment bottoms 8 to be inserted. It will be appreciated that alternatively it would also be possible to reverse the relative position of the tongue elements 12 with respect to the compartment bottoms 8, especially as when the energy guiding chain changes direction in the direction-changing arc and moves into the opposite direction, up and down are interchanged. In the illustrated embodiment the resilient tongue elements 12 are arranged at the side of the respective recess 9, that is towards the holding head 19.

The resilient tongue elements 12 each have on the side towards the respective recess 9 a projecting nose 15 which additionally stabilises the inserted compartment bottoms in the recesses.

The projecting noses 15 provided on the tongue elements 12 are arranged near the inner end of the insertion opening 11 so that the fit of the compartment bottoms 8 in the recesses 9 is additionally secured thereby so that this acts against the compartment bottoms 8 accidentally slipping out of the recesses 9 in the longitudinal direction of the energy guiding chain 1. That additional security is afforded in particular by virtue of the fact that the projecting nose 15 bears against the compartment bottom 8 under a prestressing in the region of the end of the compartment bottom 8, that is towards the insertion opening 11.

As can be particularly clearly seen from FIG. 3 the tongue element on the side towards the recess 9 has a latching projection 16 which can hold an inserted compartment bottom 8 in a direction transversely relative to the longitudinal direction of the chain or in a direction perpendicular to the main plane of the separator 7.

What is essential in regard to the described energy guiding chain according to the invention is the novel configuration of the separators which serve to subdivide the guide passage 6 and form a particularly reliable holding action for the compartment bottoms 8 extending perpendicularly to the separators 7.

Insertion of the compartment bottoms 8 into the recesses 9 of the separators 7 can be effected without using tools in a very simple fashion by the compartment bottoms 8 being pressed through the insertion openings 11 into the recesses 9 in the separators 7 without the entire separator 7 having to be elastically bent. In that way it is possible to use a very strong stable material for the separators.

Removal of the compartment bottoms 8 is also very simple and can be effected without the use of tools by the compartment bottoms 8 being simply pulled by hand out of the recesses 9 through the insertion openings 11, in which case only the respective resilient tongue element 12 is deformed and deflects back into the free space 13 behind it.

The insertion openings 11 are displaced upwardly with respect to the main axis of the recesses 9 so that the insertion opening 11 opens eccentrically into the recess 9 and thereby forms a latching edge 17. The latching edge 17 cooperates with the latching nose 15 to prevent the compartment bottoms 8 from accidentally slipping out of the recesses 9 in the longitudinal direction of the energy guiding chain 1. The insertion openings 11 steadily taper towards the recesses 9 and involve a tilted orientation inclinedly upwardly at an angle of about 10°-25° to the horizontal. This facilitates fitment of the compartment bottoms from a predetermined side of the energy guiding chain 1, wherein the transverse bar 4, 5 is in the form of an opening bar at least at that side.

The terms vertical and horizontal are not to be interpreted restrictively in the present case, but equivalent to parallel to the longitudinal direction of the chain (=horizontal) or perpendicular to the longitudinal direction of the chain (=vertical) of the energy guiding chain.

LIST OF REFERENCES 1 energy guiding chain
2 side plate
3 side plate
4 upper transverse bar
5 lower transverse bar
6 guide passage
7 separators
8 compartment bottoms
9 recesses (in separators 7)
10 support region
11 insertion opening
12 resilient tongue element
13 free space
14 delimiting wall
15 projecting nose
16 latching projection
17 latching edge
18 holding foot
19 holding head The inevntion claimed is:

1. At least one separator for an energy guiding chain comprising a plurality of pivotably interconnected chain links which each have two side plates, wherein at least one of the plurality of chain links comprises two transverse bars and defines a guide passage for at least one line, in which the at least one separator is arrangeable between the transverse bars and is arrestable at at least one of the transverse bars and at least one plate-like compartment bottom is arrangeable perpendicularly to the at least one separator,
    wherein the at least one separator has a plurality of recesses in each of which the at least one compartment bottom is holdable, respectively, and wherein provided at a lateral end of each recess is a continuous rigid support region and at an opposite lateral end of each recess is a respective insertion opening to insert the at least one compartment bottom and wherein each respective insertion opening is provided with a respective resilient tongue element to partially close the respective insertion opening and to secure the at least one compartment bottom in the respective recess,
    wherein each respective resilient tongue element extends from the respective insertion opening to the support region of the at least one separator,
    wherein one end of each respective resilient tongue element is connected to an edge of the respective insertion opening and an other end of each respective resilient tongue element is connected to the support region,
    wherein on a side of each respective resilient tongue element that is facing away from the recess is a respective free space into which the respective resilient tongue element is elastically deflectable during insertion and removal of the at least one compartment bottom, and wherein, in a longitudinal direction of the chain, a main dimension of the respective free space is larger than a corresponding main dimension of the respective recess.

2. The at least one separator according to claim 1, wherein the at least one separator comprises plastic.

3. The at least one separator according to claim 2, wherein the at least one separator is in the form of a one-piece part.

4. The at least one separator according to claim 3, wherein the one end of each respective resilient tongue element is integrally formed at the edge of the respective insertion opening and the other end of each respective resilient tongue element is integrally formed at the support region.

5. The at least one separator according to claim 1, wherein each recess is defined by a respective delimiting wall, arranged opposite to the respective resilient tongue element, which is adapted to an external contour of the at least one compartment bottom.

6. The at least one separator according to claim 1, wherein on a side of each respective resilient tongue element that is facing towards the recess, the respective resilient tongue element has a respective projecting nose.

7. The at least one separator according to claim 6, wherein the respective projecting nose on each respective resilient tongue element is arranged near an inner end of the respective insertion opening.

8. The at least one separator according to claim 7, wherein when the at least one compartment bottom is inserted in one of the recesses, the respective projecting nose on the respective resilient tongue element bears against the at least one compartment bottom under a prestressing in a region of a side of the at least one compartment bottom that is facing towards the respective insertion opening.

9. The at least one separator according to claim 1, wherein the respective insertion opening of each recess opens towards a same side of the at least one separator.

10. The at least one separator according to claim 1, wherein, in the longitudinal direction of the chain, the main dimension of the respective free space is at least 60% of a dimension of the at least one separator.

11. The at least one separator according to claim 1 wherein, on a side of each respective resilient tongue element that is facing towards the recess, the respective resilient tongue element has a latching projection to secure the at least one compartment bottom in a direction transversely relative to a longitudinal direction of the chain.

12. An energy guiding chain comprising:
a plurality of pivotably interconnected chain links which each have two side plates, wherein at least one of the plurality of chain links comprises two transverse bars and defines a guide passage for at least one line,
a plurality of vertical separators which are arranged between the transverse bars and are arrested at at least one of the transverse bars, wherein each of the vertical separators has a plurality of recesses,
a plurality of horizontal plate-like compartment bottoms which are each holdable in one of the recesses of each of the vertical separators, respectively,
wherein provided at a lateral end of each recess of each vertical separator is a continuous rigid support region and at an opposite lateral end of each recess of each vertical separator is a respective insertion opening to insert the respective compartment bottom and wherein each respective insertion opening is provided with a respective resilient tongue element to partially close the respective insertion opening and to secure the respective compartment bottom,
wherein
each respective resilient tongue element extends from the respective insertion opening to the support region of each vertical separator, respectively,
one end of each respective resilient tongue element is connected to an edge of the respective insertion opening and another end to the support region,
on a side of each respective resilient tongue element that is facing away from the recess is a respective free space into which the respective resilient tongue element is elastically deflectable upon insertion and removal of one of the compartment bottoms, and
wherein, in a longitudinal direction of the chain, a main dimension of the respective free space is larger than a corresponding main dimension of the respective recess.

* * * * *